(12) United States Patent
Zhang et al.

(10) Patent No.: US 11,323,014 B2
(45) Date of Patent: May 3, 2022

(54) DRIVING MOTOR WITH ASYMMETRIC MAGNETIC POLE TYPE OF PERMANENT MAGNET AND CLAW POLE ELECTRIC EXCITATION FOR ELECTRIC AUTOMOBILE

(71) Applicant: SHANDONG UNIVERSITY OF TECHNOLOGY, Shandong (CN)

(72) Inventors: Xueyi Zhang, Shandong (CN); Wenjing Hu, Shandong (CN); Yulong Lei, Shandong (CN); Shanjian Wang, Shandong (CN); Hongbin Yin, Shandong (CN); Huihui Geng, Shandong (CN)

(73) Assignee: SHANDONG UNIVERSITY OF TECHNOLOGY, Shandong (CN)

( * ) Notice: Subject to any disclaimer, the term of this patent is extended or adjusted under 35 U.S.C. 154(b) by 0 days.

(21) Appl. No.: 17/045,122

(22) PCT Filed: Mar. 31, 2020

(86) PCT No.: PCT/CN2020/082278
§ 371 (c)(1),
(2) Date: Oct. 2, 2020

(87) PCT Pub. No.: WO2020/216012
PCT Pub. Date: Oct. 29, 2020

(65) Prior Publication Data
US 2022/0037973 A1 Feb. 3, 2022

(30) Foreign Application Priority Data
Apr. 23, 2019 (CN) .......................... 201910328938.9

(51) Int. Cl.
*H02K 1/27* (2022.01)
*H02K 21/04* (2006.01)

(52) U.S. Cl.
CPC .................................. *H02K 21/044* (2013.01)

(58) Field of Classification Search
USPC ......................................... 310/156.53–156.57
See application file for complete search history.

(56) References Cited

U.S. PATENT DOCUMENTS

| 7,504,754 B2 * | 3/2009 | Jahns | ..................... | H02K 21/14 |
| | | | | 310/156.53 |
| 7,518,278 B2 * | 4/2009 | Hsu | ...................... | H02K 21/046 |
| | | | | 310/191 |

(Continued)

FOREIGN PATENT DOCUMENTS

| CN | 1213207 A | 4/1999 |
| CN | 104506005 A | 4/2015 |

(Continued)

OTHER PUBLICATIONS

International Search Report in PCT International Application No. PCT/CN2020/082278, dated Jun. 17, 2020.

*Primary Examiner* — Tran N Nguyen
(74) *Attorney, Agent, or Firm* — MagStone Law, LLP; Enshan Hong

(57) ABSTRACT

The disclosure discloses a driving motor with an asymmetrical magnetic pole type of permanent magnet and claw pole electric excitation for an electric automobile which includes a front end cover, a rear end cover, a housing, an asymmetric magnetic pole type of permanent magnet rotor, a claw pole electric excitation rotor, and a stator. Wherein the asymmetric magnetic pole type of permanent magnet rotor is provided with first magnetic pole groups and second magnetic pole groups, the first magnetic pole groups and the second magnetic pole groups are of an asymmetric structure, polarities of outer sides of the first magnetic pole groups and the second magnetic pole groups are distributed in a manner of N poles and S poles arranged at intervals. A utilization of (Continued)

inner space of the motor rotor can be improved, the performance of the motor is improved, and the costs of the motor are reduced.

1 Claim, 1 Drawing Sheet

(56) References Cited

U.S. PATENT DOCUMENTS

| | | | | |
|---|---|---|---|---|
| 2010/0079026 A1* | 4/2010 | Han | ...................... | H02K 1/2766 310/156.53 |
| 2012/0200187 A1* | 8/2012 | Sano | ...................... | H02K 1/2766 310/156.07 |
| 2012/0200188 A1* | 8/2012 | Sano | ...................... | H02K 1/2766 310/216.106 |
| 2013/0307363 A1* | 11/2013 | Sano | ...................... | H02K 1/2766 310/156.01 |
| 2018/0262091 A1 | 9/2018 | Gieras et al. | | |

FOREIGN PATENT DOCUMENTS

| | | | |
|---|---|---|---|
| CN | 105846569 | A | 8/2016 |
| CN | 105958775 | A | 9/2016 |
| CN | 206250862 | U | 6/2017 |
| CN | 109995164 | A | 7/2019 |
| EP | 3376650 | A1 | 9/2018 |

* cited by examiner

DRIVING MOTOR WITH ASYMMETRIC MAGNETIC POLE TYPE OF PERMANENT MAGNET AND CLAW POLE ELECTRIC EXCITATION FOR ELECTRIC AUTOMOBILE

CROSS-REFERENCE TO RELATED APPLICATIONS

This application is a 35 U.S.C. § 371 national stage application of PCT International Application No. PCT/CN2020/082278, filed on Mar. 31, 2020, which claims the benefit of Chinese Application No. 201910328938.9, filed on Apr. 23, 2019, both of which are hereby incorporated by reference in their entirety.

TECHNICAL FIELD

The disclosure relates to a technical field of motor elements of an electric automobile, more particular to a driving motor with an asymmetric magnetic pole type of permanent magnet and claw pole electric excitation for an electric automobile.

BACKGROUND

The rotor of the permanent magnet driving motor adopted in the current electric automobile mostly has a structure of multiple permanent magnets per magnetic pole. As in the conventional art, the patent Publication No. CN 1213207A, entitled "Permanent Magnet Rotor Type Of Electric Motor", discloses the following technical solution: each magnetic pole is formed of three permanent magnets made from at least two kinds of magnetic materials, such as representative ferrite magnet and rare-earth magnet, the rotor of the motor with this structure is of a symmetric magnetic pole structure, and the material type of permanent magnet steel is changed to reduce the motor costs, which can inevitably affect the performance of the motor. Therefore, it is necessary to improve the motor performance and reduce the motor costs with respect to the magnetic pole structure of the motor.

SUMMARY

The disclosure intends to provide a permanent magnet driving motor with combined spaced magnetic poles for an electric automobile, in a rotor of which adjacent magnetic poles are of an asymmetric structure, and which can overcome the above defects and improve the motor performance and reduce the motor costs. The technical contents are as follows:

A driving motor with an asymmetrical magnetic pole type of permanent magnet and claw pole electric excitation for an electric automobile includes a front end cover, a rear end cover, a housing, an asymmetric magnetic pole type of permanent magnet rotor, a claw pole electric excitation rotor, and a stator, wherein the asymmetric magnetic pole type of permanent magnet rotor includes a shaft, first rectangular permanent magnet steels, second rectangular permanent magnet steels, a rotor core, first magnetic isolation air gaps, and second magnetic isolation air gaps, wherein an even number of magnetic pole groups are uniformly distributed on the rotor core along a circumferential direction, and magnetic pole groups include first magnetic pole groups and second magnetic pole groups, and polarities of outer sides of the first magnetic pole groups and the second magnetic pole groups are distributed in a manner of N poles and S poles arranged at intervals;

the first magnetic pole group includes two first rectangular permanent magnet steels, one second rectangular permanent magnet steel and two first magnetic isolation air gaps, and the second magnetic pole group includes one second rectangular permanent magnet steel and two second magnetic isolation air gaps; a pole arc of the first magnetic pole group is smaller than the pole arc of the second magnetic pole group; the first rectangular permanent magnet steel is of a non-radial structure;

a distance between outer ends of the two first rectangular permanent magnet steels is greater than a distance between inner ends of the two first rectangular permanent magnet steels, and the two first rectangular permanent magnet steels are of an axisymmetric structure;

the second rectangular permanent magnet steel is of a tangential structure and is symmetrical about a diameter, and a distance between a center of the second rectangular permanent magnet steel and a center of a rotating shaft is smaller than that between a center of the first rectangular permanent magnet steel and the center of the rotating shaft, and the distance between the center of the second rectangular permanent magnet steel and the center of the rotating shaft is larger than that between an inner end of the first rectangular permanent magnet steel and the center of the rotating shaft; a length of the second rectangular permanent magnet steel in the direction perpendicular to a diameter direction is ⅓~½ of a length between the inner ends of two adjacent first rectangular permanent magnet steels in adjacent first magnetic pole groups;

the two first magnetic isolation air gaps are respectively arranged at a left end and a right end of the second rectangular permanent magnet steel in the first magnetic pole group, a cross section of the first magnetic isolation air gap is a right triangle, one end of the first magnetic isolation air gap is communicated with the second rectangular permanent magnet steel, and the other end of the first magnetic isolation air gap is not communicated with the first rectangular permanent magnet steel;

the second magnetic isolation air gaps are respectively arranged between the inner end of the first rectangular permanent magnet steel and the left end and the right end of the second rectangular permanent magnet steel in the second magnetic pole group, the second magnetic isolation air gap is communicated with the first rectangular permanent magnet steel, the second magnetic isolation air gap is not communicated with the second rectangular permanent magnet steel, and the rotor core is press-fitted on the shaft.

The working principle is as follows: when the driving motor is supplied with three-phase alternating current modulated by a three-phase inverter through width modulation, the stator of the driving motor generates a space rotating magnetic field, the space rotating magnetic field interacts with the magnetic field generated by the rotor, and the rotor generates rotating torque which is consistent with a direction of the rotating magnetic field of a stator winding, so that the rotor of the driving motor rotates to drive the electric automobile to run.

Compared with the conventional art, the driving motor with an asymmetric magnetic pole type of permanent magnet and claw pole electric excitation for the electric automobile is designed and developed in the present disclosure, wherein, permanent magnets are embedded in the asymmetric magnetic pole type of permanent magnet rotor, the first rectangular permanent magnet steels and the second rectangular permanent magnet steel are designed in a distribution mode, a utilization of inner space of the motor rotor can be improved by changing the magnetic pole structure, the performance of the motor is improved as the second magnet collects part of the magnetic field of the first magnet to compensate for a middle recess of an air gap waveform of each pole, and the costs of the motor is reduced as the amount of the permanent magnets used is reduced.

DETAILED DESCRIPTION OF THE EMBODIMENTS

Figure 1:
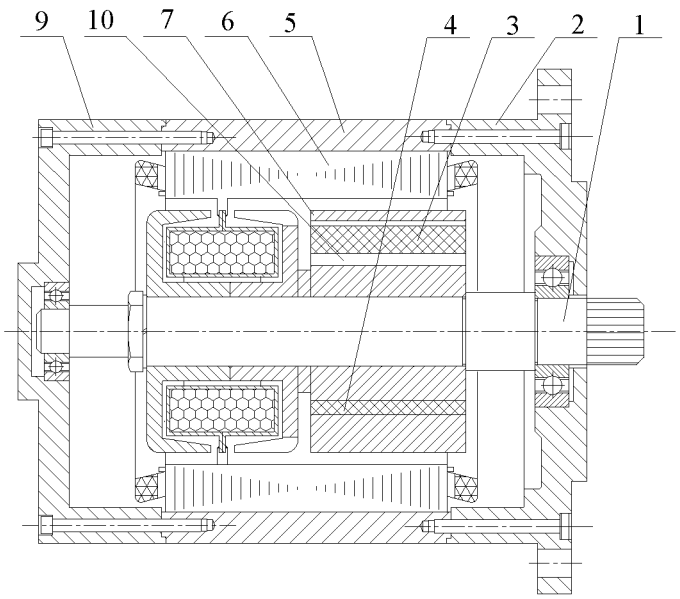
FIG. 1 is a sectional structure diagram of a driving motor with an asymmetric magnetic pole type of permanent magnet and claw pole electric excitation for an electric automobile according to the present disclosure.
Figure 2:
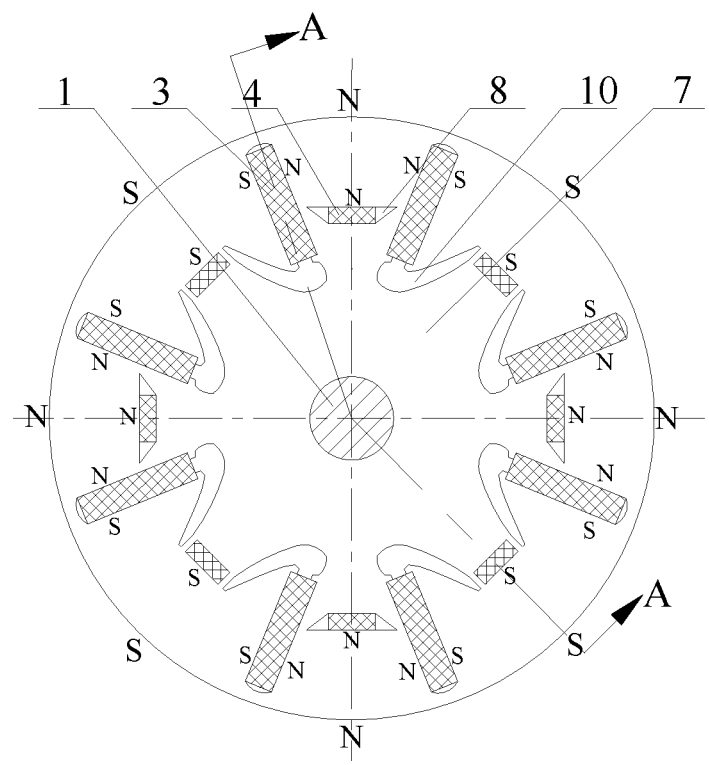
FIG. 2 is a sectional structure diagram of the permanent magnet rotor according to the present disclosure.

The present disclosure is described in further detail below with reference to the drawings so that those skilled in the art can implement the disclosure by referring to the description text.

A driving motor with an asymmetrical magnetic pole type of permanent magnet and claw pole electric excitation for an electric automobile includes a front end cover 2, a rear end cover 9, a housing 5, an asymmetric magnetic pole type of permanent magnet rotor, a claw pole electric excitation rotor, and a stator 6, wherein the asymmetric magnetic pole type of permanent magnet rotor includes a shaft 1, first rectangular permanent magnet steels 3, second rectangular permanent magnet steels 4, a rotor core 7, first magnetic isolation air gaps 8, and second magnetic isolation air gaps 10, wherein an even number of magnetic pole groups are uniformly distributed on the rotor core 7 along a circumferential direction, and magnetic pole groups include first magnetic pole groups and second magnetic pole groups, and polarities of outer sides of the first magnetic pole groups and the second magnetic pole groups are distributed in a manner of N poles and S poles arranged at intervals;

the first magnetic pole group includes two first rectangular permanent magnet steels 3, one second rectangular permanent magnet steel 4 and two first magnetic isolation air gaps 8, and the second magnetic pole group includes one second rectangular permanent magnet steel 4 and two second magnetic isolation air gaps 10. A pole arc of the first magnetic pole group is smaller than the pole arc of the second magnetic pole group. The first rectangular permanent magnet steel 3 is of a non-radial structure;

a distance between outer ends of the two first rectangular permanent magnet steels 3 is greater than a distance between inner ends of the two first rectangular permanent magnet steels 3, and the two first rectangular permanent magnet steels 3 are of an axisymmetric structure;

the second rectangular permanent magnet steel is of a tangential structure and is symmetrical about a diameter, and a distance between a center of the second rectangular permanent magnet steel 4 and a center of a rotating shaft is smaller than that between a center of the first rectangular permanent magnet steel 3 and the center of the rotating shaft, and the distance between the center of the second rectangular permanent magnet steel 4 and the center of the rotating shaft is larger than that between an inner end of the first rectangular permanent magnet steel 3 and the center of the rotating shaft; a length of the second rectangular permanent magnet steel 4 in the direction perpendicular to a diameter direction is ⅓~½ of a length between the inner ends of two adjacent first rectangular permanent magnet steels 3 in two adjacent first magnetic pole groups;

the two first magnetic isolation air gaps 8 are respectively arranged at a left end and a right end of the second rectangular permanent magnet steel 4 in the first magnetic pole group, a cross section of the first magnetic isolation air gap 8 is a right triangle, one end of the first magnetic isolation air gap 8 is communicated with the second rectangular permanent magnet steel 4, and the other end of the first magnetic isolation air gap 8 is not communicated with the first rectangular permanent magnet steel 3;

the second magnetic isolation air gaps 10 are respectively arranged between the inner end of the first rectangular permanent magnet steel 3 and the left end and the right end of the second rectangular permanent magnet steel 4 in the second magnetic pole group, the second magnetic isolation air gap 10 is communicated with the first rectangular permanent magnet steel 3, the second magnetic isolation air gap 10 is not communicated with the second rectangular permanent magnet steel 4, and the rotor core 7 is press-fitted on the shaft 1.

What is claimed:

1. A driving motor with an asymmetrical magnetic pole type of permanent magnet and claw pole electric excitation for an electric automobile comprising a front end cover (2), a rear end cover (9), a housing (5), an asymmetric magnetic pole type of permanent magnet rotor, a claw pole electric excitation rotor, and a stator (6), wherein the asymmetric magnetic pole type of permanent magnet rotor comprises a shaft (1), first rectangular permanent magnet steels (3), second rectangular permanent magnet steels (4), a rotor core (7), first magnetic isolation air gaps (8), and second magnetic isolation air gaps (10), wherein an even number of magnetic pole groups are uniformly distributed on the rotor core (7) along a circumferential direction, and magnetic pole groups include first magnetic pole groups and second magnetic pole groups, and polarities of outer sides of the first magnetic pole groups and the second magnetic pole groups are distributed in a manner of N poles and S poles arranged at intervals;

the first magnetic pole group includes two first rectangular permanent magnet steels (3), one second rectangular permanent magnet steel (4) and two first magnetic isolation air gaps (8), and the second magnetic pole group includes one second rectangular permanent magnet steel (4) and two second magnetic isolation air gaps (10); a pole arc of the first magnetic pole group is smaller than the pole arc of the second magnetic pole group; the first rectangular permanent magnet steel (3) is of a non-radial structure;

a distance between outer ends of the two first rectangular permanent magnet steels (3) is greater than a distance between inner ends of the two first rectangular permanent magnet steels (3), and the two first rectangular permanent magnet steels (3) are of an axisymmetric structure;

the second rectangular permanent magnet steel is of a tangential structure and is symmetrical about a diameter, and a distance between a center of the second rectangular permanent magnet steel (4) and a center of a rotating shaft is smaller than that between a center of the first rectangular permanent magnet steel (3) and the center of the rotating shaft, and the distance between the center of the second rectangular permanent magnet steel (4) and the center of the rotating shaft is larger than that between an inner end of the first rectangular permanent magnet steel (3) and the center of the rotating shaft; a length of the second rectangular permanent magnet steel (4) in the direction perpendicular to a diameter direction is ⅓~½ of a length between the inner ends of two adjacent first rectangular permanent magnet steels (3) in adjacent first magnetic pole groups;

the two first magnetic isolation air gaps (8) are respectively arranged at a left end and a right end of the second rectangular permanent magnet steel (4) in the first magnetic pole group, a cross section of the first magnetic isolation air gap (8) is a right triangle, one end of the first magnetic isolation air gap (8) is communicated with the second rectangular permanent magnet steel (4), and the other end of the first magnetic isolation air gap (8) is not communicated with the first rectangular permanent magnet steel (3);

the second magnetic isolation air gaps (10) are respectively arranged between the inner end of the first rectangular permanent magnet steel (3) and the left end and the right end of the second rectangular permanent magnet steel (4) in the second magnetic pole group, the second magnetic isolation air gap (10) is communicated with the first rectangular permanent magnet steel (3), the second magnetic isolation air gap (10) is not communicated with the second rectangular permanent magnet steel (4), and the rotor core (7) is press-fitted on the shaft (1).

\* \* \* \* \*